United States Patent [19]
Lyons

[11] Patent Number: 6,101,615
[45] Date of Patent: Aug. 8, 2000

[54] METHOD AND APPARATUS FOR IMPROVING SEQUENTIAL WRITES TO RAID-6 DEVICES

[75] Inventor: Gary Robert Lyons, Leander, Tex.

[73] Assignee: International Business Machines Corporation, Armonk, N.Y.

[21] Appl. No.: 09/057,382

[22] Filed: Apr. 8, 1998

[51] Int. Cl.[7] .................................................. G06F 11/00
[52] U.S. Cl. ................................. 714/6; 714/6; 714/770; 711/114
[58] Field of Search .......................... 714/770, 6; 711/114

[56] References Cited

U.S. PATENT DOCUMENTS 5,499,253   3/1996   Lary ........................................ 711/114

FOREIGN PATENT DOCUMENTS 10-240453   9/1998   Japan .

OTHER PUBLICATIONS

Chen et al. RAID;: High Performance, Reiable Secondary Storage, ACM Computing Surveys vol. 26 No. 2, Jun. 1994, entire document.

*Primary Examiner*—Robert W. Beausoliel, Jr.
*Assistant Examiner*—Bryce Bonzo
*Attorney, Agent, or Firm*—Volel Emile; Felsman, Bradley, Vaden, Gunter & Dillon, LLP

[57] ABSTRACT

A method is provided for reducing the number of transactions for multi-segmented host system write operations in a RAID 6 device. The method comprises sending a write command for new multiple data segments to a plurality of data drives in the RAID 6 device via a RAID 6 controller. The RAID 6 device has data segments stored in stripes on the data drives and parity drives within the RAID 6 device. Parity is calculated for old data segments, new data segments and old parity on the parity drives to determine a new parity. The new parity is then written to one parity drive of the multiple parity drives within the RAID 6 device, thereby reducing the number of read and write transactions between the controller and the drives within the RAID 6 device.

21 Claims, 6 Drawing Sheets

METHOD AND APPARATUS FOR IMPROVING SEQUENTIAL WRITES TO RAID-6 DEVICES

BACKGROUND OF THE INVENTION

1. Technical Field

The present invention relates in general to read and write commands to nonvolatile memory devices within a data processing system and in particular to read and write commands from a controller to a Redundant Array of Independent Disks within a data processing system. Still more particularly, the present invention relates to reducing the number of parity read and write commands between a controller and a Redundant Array of Independent Disks, Level 6.

2. Description of the Related Art

A Redundant Array of Independent Disks ("RAID") is an array, or group, of hard disk drives controlled by a single array controller and combined to achieve higher transfer rates than a single, large drive. Even though multiple drives are controlled by one adapter, the RAID device appears as one drive to the data processing system. Depending on the configuration, the RAID device will increase the level of protection and storage capacity for a data processing system over a single, hard disk drive. The primary functions of the RAID system are to increase the availability, protection and storage capacity of data for a data processing system.

RAID technology generally distributes data across the drives according to the format of the particular RAID classification (RAID 1, 2, 3, 4, 5 or 6). Copies or portions of data for a particular file may be written in segments on more than one disk drive, a process referred to as "striping." By storing the data and instructions on multiple drives, higher data transfer rates are enhanced by the ability of the controller to schedule read and write commands to multiple drives in parallel.

RAID 5 reads and writes data segments across multiple data drives and writes parity to the same data disks. The parity data is never stored on the same drive as the data it protects, allowing for concurrent read and write operations. Within any stripe of a five drive RAID 5 configuration, all drives contain data information and parity information. If one of the data drives were to fail, the remaining four data drives and the parity on each remaining may be used to regenerate user data which improves improving data protection.

RAID 6 improves the data protection of RAID 5 by providing two parity drives. The original technique for data protection in RAID 6 was to copy the parity drive onto a parallel parity drive, or "mirror" the parity drive. This protects the RAID 6 device from a parity drive failure, but does not protect the group from failure of two data drives. In order to protect against multiple data drive failures, RAID 6 changes the configuration so that the second parity drive will protect across different drive groups. For instance, parity drives are arranged so that each data drive has parity stored on two parity drives. A RAID 6 device with this configuration would be depicted as having multiple rows and multiple columns of data drives with each row and column ending with a parity drive. Parity of each data drive would then be stored on two drives.

In large arrays the increase in the number of additional drives is substantial, but not prohibitive. If the array is a ten by ten array, of 120 drives only 20 are parity drives. However, in small arrays the percentage increase is large. For example, if the RAID subsystem contained a four by four array of data drives, a parity drive would be added for each row of data drives. In addition, parity drives would be added for each column. Therefore, for an array containing sixteen data drives, there would be eight parity drives—a fifty percent increase in the number of drives.

A RAID 6 device provides extra data protection but, at a somewhat prohibitive cost. The two group version of RAID 6 requires that a single data disk belong to two parity groups. If a data drive stripe were to be updated, the parity information of all parity drives affected would also need to be updated resulting in many more reads and writes.

Figure 5:
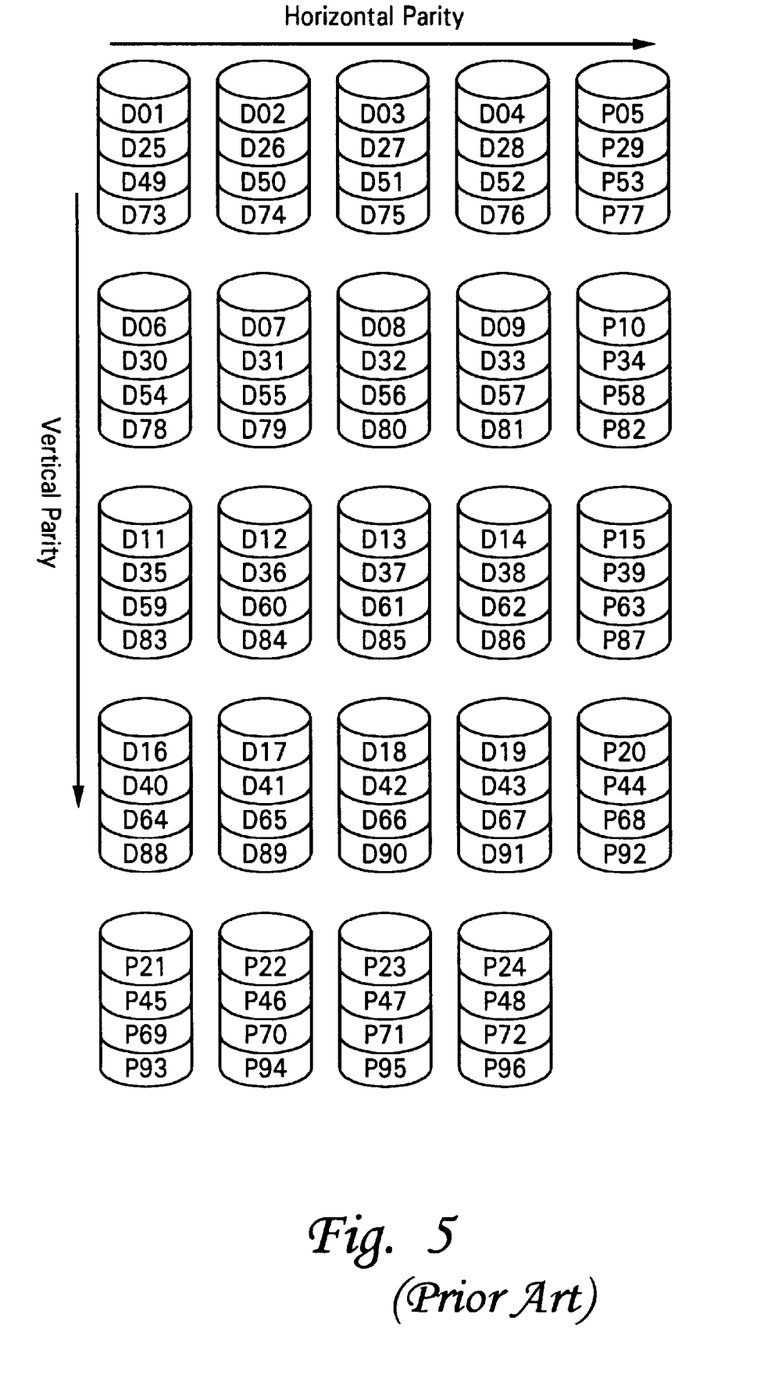
FIG. 5 depicts an illustration of parity distribution on a RAID 6 device.

In FIG. 5, a RAID 6 configuration is depicted, showing the first several data stripes on the individual drives. The letter "D" in the diagram indicates that DATA is stored in that location and "P" indicates that PARITY is stored in that location. The number indicates the data segment stored in that location. For example, to calculate the parity information stored in P05, a RAID 6 device would need to read D01, D02, D03, and D04. It would then calculate the parity and write the results to P05.

In the two group version of RAID 6, a single disk belongs to two parity groups. In this instance, D01 belongs to a horizontal parity stripe and a vertical parity stripe. In order to update D01, parity information stored at P05 and P21 also needs to be updated.

Using the two parity group version, a RAID 6 device could handle up to three drive failures without losing any information. For example, if D01 failed, its information could be retrieved using either the horizontal rank or vertical rank parity drives. If P21 also failed, the vertical rank would not contain enough information to regenerate D01. However, the horizontal rank would be available to regenerate D01. On the other hand, if on the horizontal rank, P05, were to fail then the vertical rank parity drive could be used to regenerate D01. If both the vertical rank, P21, and the horizontal rank, P05, were to fail before D01 were regenerated, then D01 could not be regenerated from either the horizontal or vertical ranks.

A significant problem with RAID 6 devices is the number of parity updates that must be generated. When a data drive is updated, parity needs to be calculated for two drives. This procedure, referring again to FIG. 5, requires a read to the data drive D01 and the parity drives P05 and P21. In addition, a write is required to the data drive D01 and both parity drives, P05 and P21. This is for a single drive stripe write.

Figure 6:
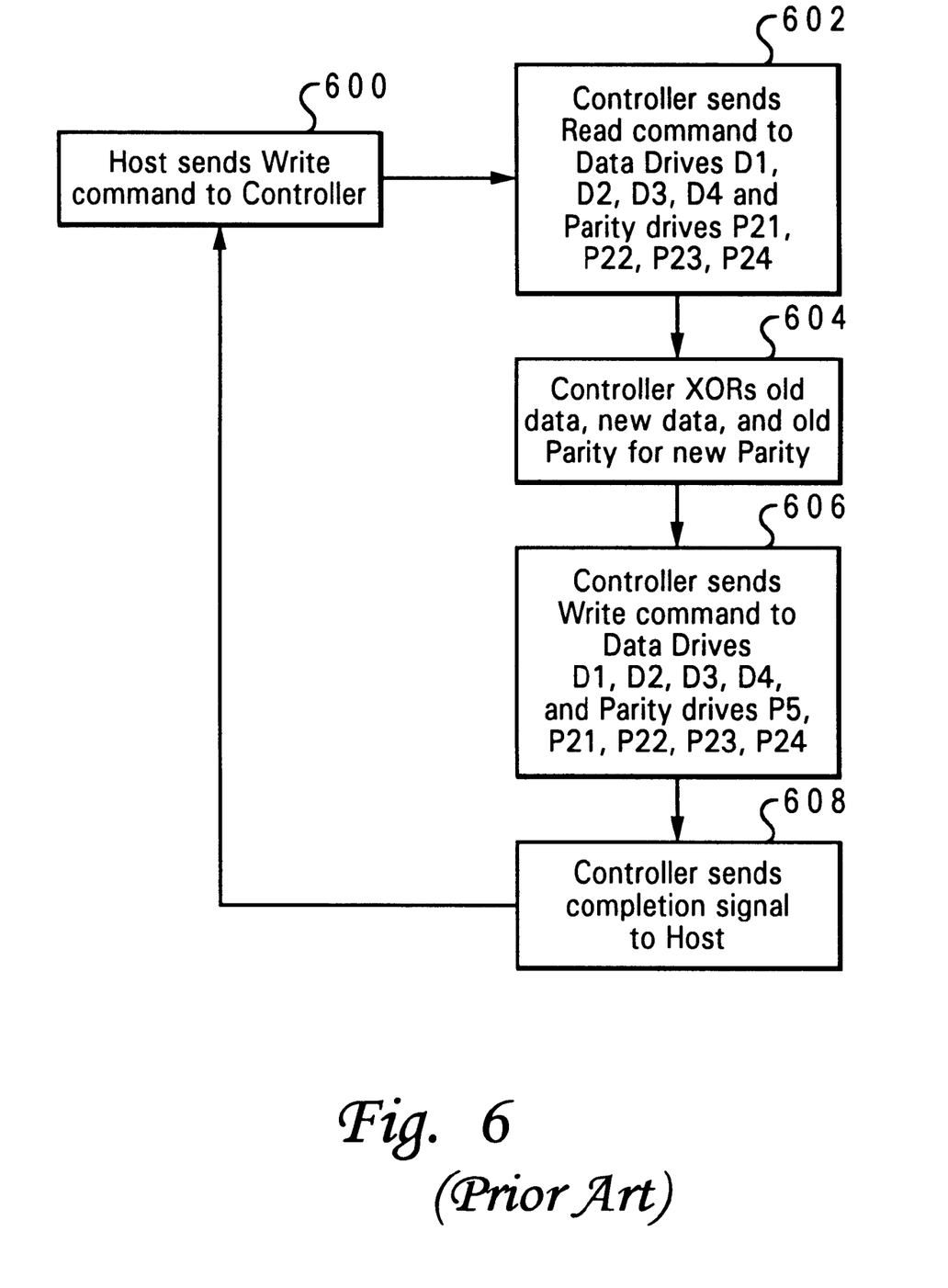
FIG. 6 is a high level flow diagram of parity calculations and distribution on a RAID 6 device.

An example of a full stripe write, in a RAID 6 configuration, is depicted in FIG. 6 (assuming the four by four disk array in FIG. 5). The process begins with step 600, which depicts the host sending a write command to the RAID 6 controller. The process passes to step 602, which illustrates the controller sending a read command to D01, D02, D03, D04 and Parity drives P21, P22, P23, and P24. The process proceeds to step 604, which depicts the controller XORing the old data, the new data and the old parity. This new parity is then written to the parity drives, P21, P22, P23, and P24, in segments across the vertical parity drive stripe. The process then continues to step 606, which illustrates the controller sending a write command to the data drives DO, D02, D03, and D04 and the parity drives P05, P21, P22, P23, and P24. The process then passes to step 608, which depicts the controller sending a completion signal to the host.

In summary, the write command requires a read to segments on each of four data drives, e.g., R(1,2,3,4), where R(1,2,3,4) are reads to segments D0, D02, D03 and D04. In addition, reads to the Parity drives R(21,22,23,24) are required for vertical parity calculations, writes W(1,2,3,4,5, 21,22,23,24) are needed to write out the user data and all of the parity data (referring to FIG. 5). A read to each of four parity drives and a write to each of the parity drives and data drives are required. A minimum full stripe write to a four by four disk array requires eight Read operations and 9 Write operations, even where the RAID 6 subsystem leverages its horizontal parity by eliminating the need to write to the horizontal parity drive.

It would be desirable, therefore, to provide a method for reducing the number of parity writes for RAID 6 devices.

It would also be desirable, to reduce the Input/Output load on the controller which will provide room for additional drives in the RAID 6 device controller.

SUMMARY OF THE INVENTION

It is therefore one object of the present invention to provide a method for reducing the number of parity writes for RAID 6 devices.

It is another object of the present invention to reduce the Input/Output load on the controller which will allow more drives to be added in the drive group within a RAID 6 device.

The foregoing objects are achieved as is now described. A method is provided for reducing the number of transactions for multi-segmented host system write operations in a RAID 6 device. The method comprises sending a write command for new multiple data segments to a plurality of data drives in the RAID 6 device via a RAID 6 controller. The RAID 6 device has data segments stored in stripes on the data drives and parity drives within the RAID 6 device. Parity is calculated for old data segments, new data segments and old parity on the parity drives to determine a new parity. The new parity is then written to one parity drive of the multiple parity drives within the RAID 6 device, thereby reducing the number of read and write transactions between the controller and the drives within the RAID 6 device.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
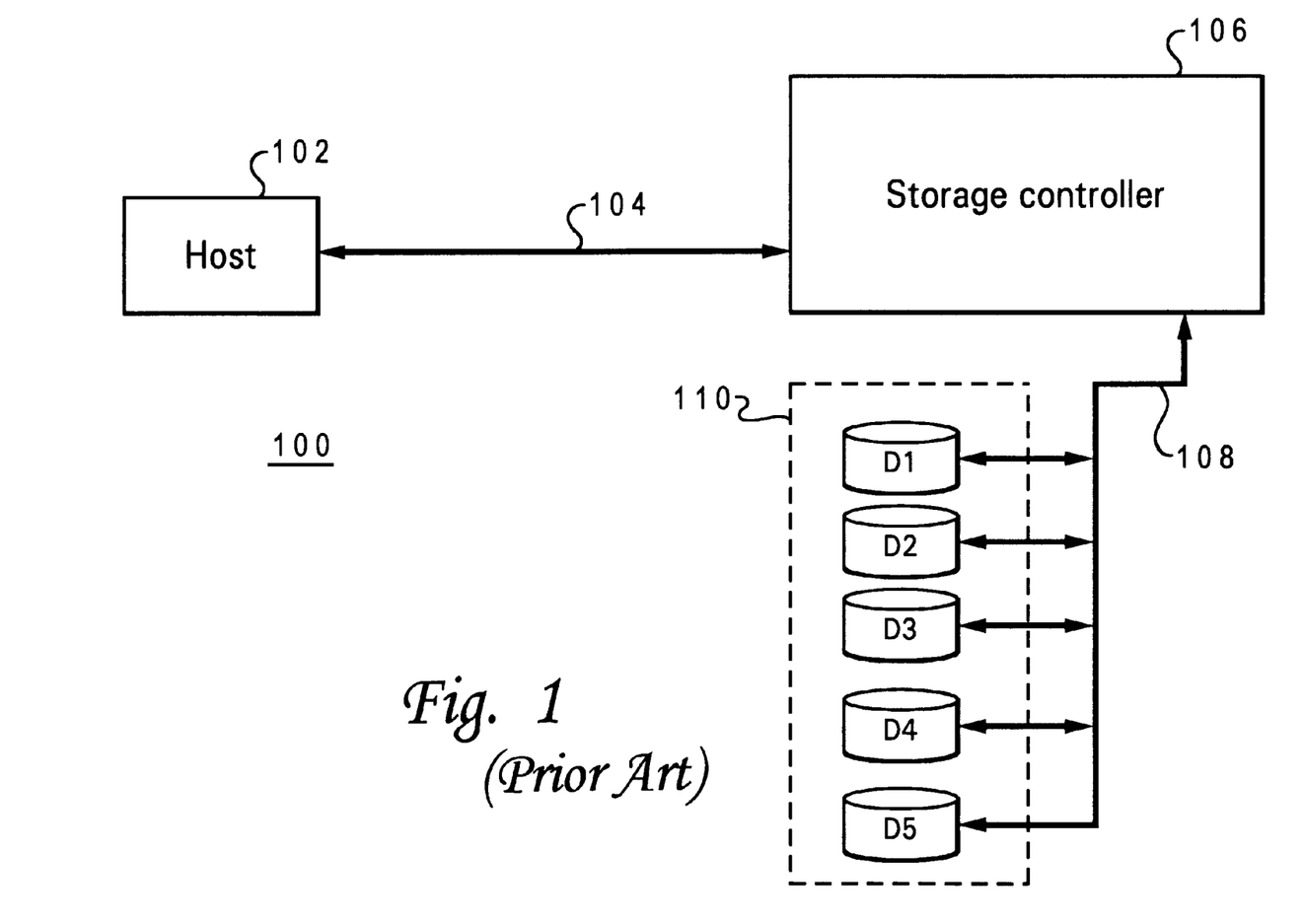
FIG. 1 depicts a high level block diagram of a data processing system in accordance with a preferred embodiment of the present invention may be implemented.

With reference now to the figures, and in particular with reference to FIG. 1, a high level block diagram of a data processing system 100 is depicted, in which a preferred embodiment of the present invention may be implemented. The exemplary embodiment depicted includes host system ("host") 102, internal bus 104 for communication between host 102 and controller 106, controller 106 for controlling transactions with Redundant Array of Independent Drives ("RAID") device 110, external bus 108 connected to controller 106 and RAID device 110. Host 102 communicates directly with controller 104 to access data processing system 100 memory subsystem; in this instance, RAID device 110. Controller 106 communicates transactions to RAID device 110, whereas host 102 perceives RAID device 110 as a large, single drive. Controller 106 implements commands and data transfers in RAID device 110 to read and write data to data drives, perform parity calculations and to write parity to specific parity drives by implementing the method in accordance with a preferred embodiment of the present invention, as described in further detail below.

Figure 2:
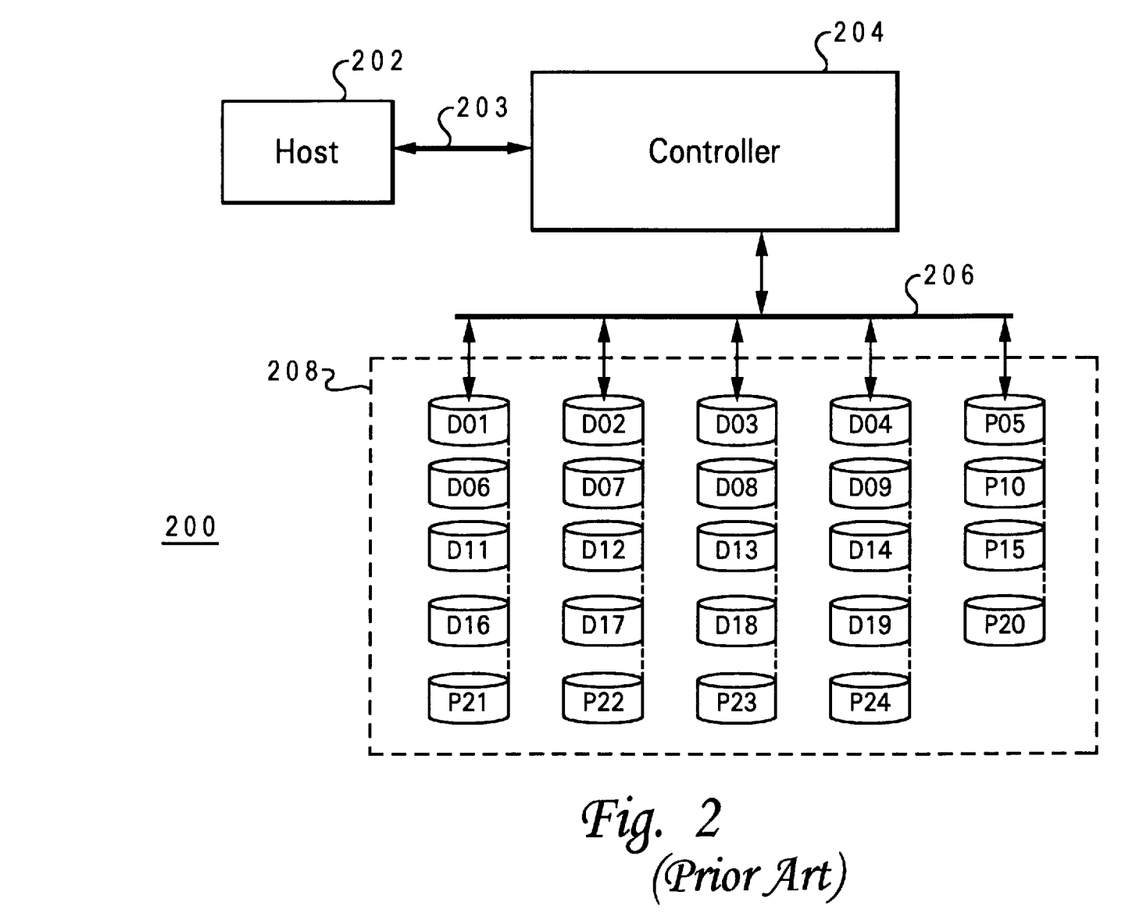
FIG. 2 is a high level block diagram of a data processing system including a RAID device, illustrating a single stripe of data segments for a four by four array in accordance with a preferred embodiment of the present invention may be implemented.

Referring to FIG. 2, a high level block diagram of a data processing system including a RAID device, depicting a single stripe of data segments for a four by four array RAID device, in accordance with a preferred embodiment of the present invention may be implemented, is illustrated. Data processing system 200 and the exemplary embodiment comprises host 202, which includes a micro processor. Host 202 is connected to controller 204 by internal bus 203. Internal bus 203 is utilized to stage data from host 202 to controller 204. Controller 204 is connected, in turn, to RAID device 208 by external bus 206. RAID device 208, comprised of a four by four array (sixteen) of data drives, is a level 6 device containing both data drives and parity drives. Data drives are designated D01, D02, etc. Parity drives are designated P05, P21, etc. The array is constructed so there are horizontal and vertical ranks. A parity drive is added to each horizontal rank of data drives and contains parity of the data segment stripes in the horizontal row of data drives. Additionally, a parity drive is added to each vertical rank that contains parity of the data segment stripe in the drives included in the vertical rank of data drives. Thus, there are four parity drives containing parity information for horizontal ranks and four parity drives containing parity information for vertical ranks; a total of eight parity drives for a four by four array (sixteen) of data drives.

Figure 3:
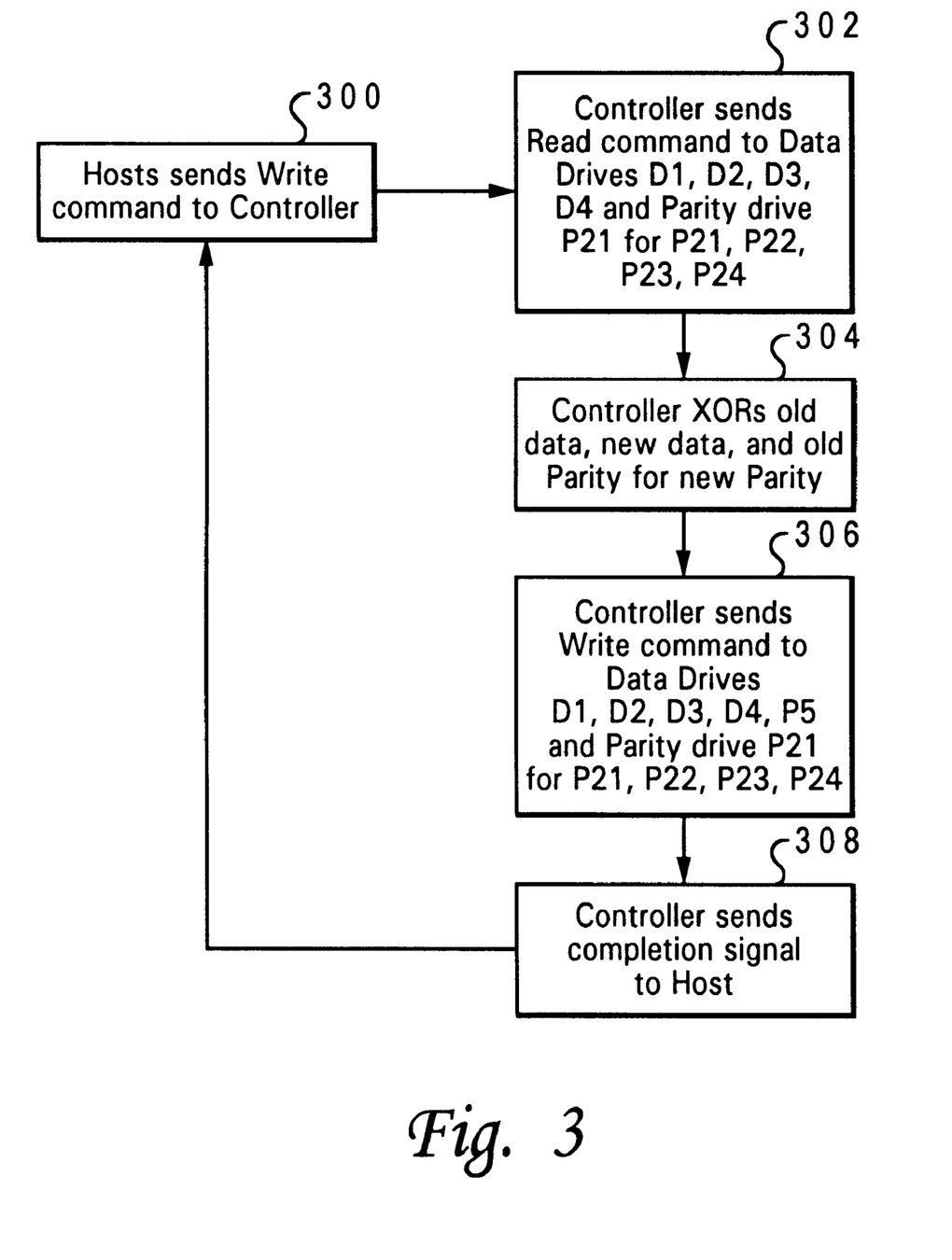
FIG. 3 depicts a high level flow diagram of the method for calculating and writing parity to a RAID 6 device in accordance with a preferred embodiment of the present invention may be implemented.

Referring now to FIG. 3, a high level flow diagram of the method for calculating and writing parity to a RAID-6 device, in accordance with a preferred embodiment of the present invention, is depicted. The process begins with step 300, which depicts the host sending a write command to the RAID-6 controller. The process continues in step 302, which illustrates the controller having received the write command and sending a read command, for stripe one, to data drives D01, D02, D03, D04, and to parity drive P21. The process then proceeds to step 304, which depicts the controller XORing old data, new data, and old parity to determine a new parity. The process passes next to step 306, which illustrates the controller sending a write command to data drives D01, D02, D03, D04, and parity drive P05. Also, parity drive P21 receives parity information that normally would go to parity drives P22, P23, and P24. Rather than writing parity information in stripes across horizontal drive P05 and vertical parity drives P21–P24, parity information is now contained on horizontal parity drive P05 and vertical drive P21. Ordinarily, in a standard RAID-6 device, parity for data drives would also be written to the remainder of the vertical rank parity drives. In the present invention all parity for the subject data drives is written instead to parity drive P21 to include the parity information on drives P22, P23, and P24. This step saves the read commands for three parity drives.

For a single stripe write to a normal RAID-6 device, five parity disks must be updated. In the present invention only two parity disks must be updated.

Instead of using the standard RAID-6 parity organization, the parity information for any given segmentation level (stripe) is located on two parity drives (one parity drive for horizontal calculations and one parity drive for vertical calculations). Parity information of P05, P10, P15, and P20 for segmentation stripe one is moved to a sequential location starting at parity drive P05. Parity information of P21, P22, P23, and P24 is likewise moved to P21.

An advantage of this configuration is that the parity information for multiple blocks can be read with a single operation. A single stripe write to a normal RAID-6 device results in read and write operations R(1,2,3,4,21,22,23,24)+ W(1,2,3,4,5,21,22,23,24). In comparison, the present invention results in a read to the data drives, R(1,2,3,4) plus a single read for the parity information on R(21) and a write to the data and parity drives of W(1,2,3,4,5,21). This is a 35% improvement over a standard RAID-6 operation. The following table shows several different types of operations and their implications on RAID-6. RAID-5 has been added for reference.

TABLE 1

| Host operations | RAID-5 Physical Operations | RAID-6 Physical Operations | RAID-6P Physical Operations | Improve % |
|---|---|---|---|---|
| (A) 3 Segment Write | R (1, 2, 3, 5) + W (1, 2, 3, 5) | R (1, 2, 3, 5, 21, 22, 23) + W (1, 2, 3, 5, 21, 22, 23) | R (1, 2, 3, 5, 21) + W (1, 2, 3, 5, 21) | 29 |
| (B) 1 Stripe Write | W (1, 2, 3, 4, 5) | R (1, 2, 3, 4, 21, 22, 23, 24) + W (1, 2, 3, 4, 5, 21, 22, 23, 24) | R (1, 2, 3, 4, 21) + W (1, 2, 3, 4, 5, 21) | 35 |
| (C) 7 Segment Write | R (6, 7, 8, 10) + W (1, 2, 3, 4, 5, 6, 7, 8, 10) | (A) + R (6, 7, 8, 10) + W (6, 7, 8, 10) | (A) + R (6, 7, 8, 5) + W (6, 7, 8, 5) | 24 |
| (D) 1 Stripe + 3 Segment Write | (B) | (B) + W (21, 22, 23) | (B) + W (21) | 29 |
| (E) 2 Stripe Write | (A) + W (6, 7, 8, 9, 10) | (A) + R (6, 7, 8, 9) + W (6, 7, 8, 9, 10) | (A) + R (6, 7, 8, 9) + W (6, 7, 8, 9) | 23 |
| (F) 3 Stripe Write | (E) + W (11, 12, 13, 14, 15) | (E) + R (11, 12, 13, 14) + W (11, 12, 13, 14, 15) | (E) + R (11, 12, 13, 14) + W (11, 12, 13, 14) | 20 |

Figure 4:
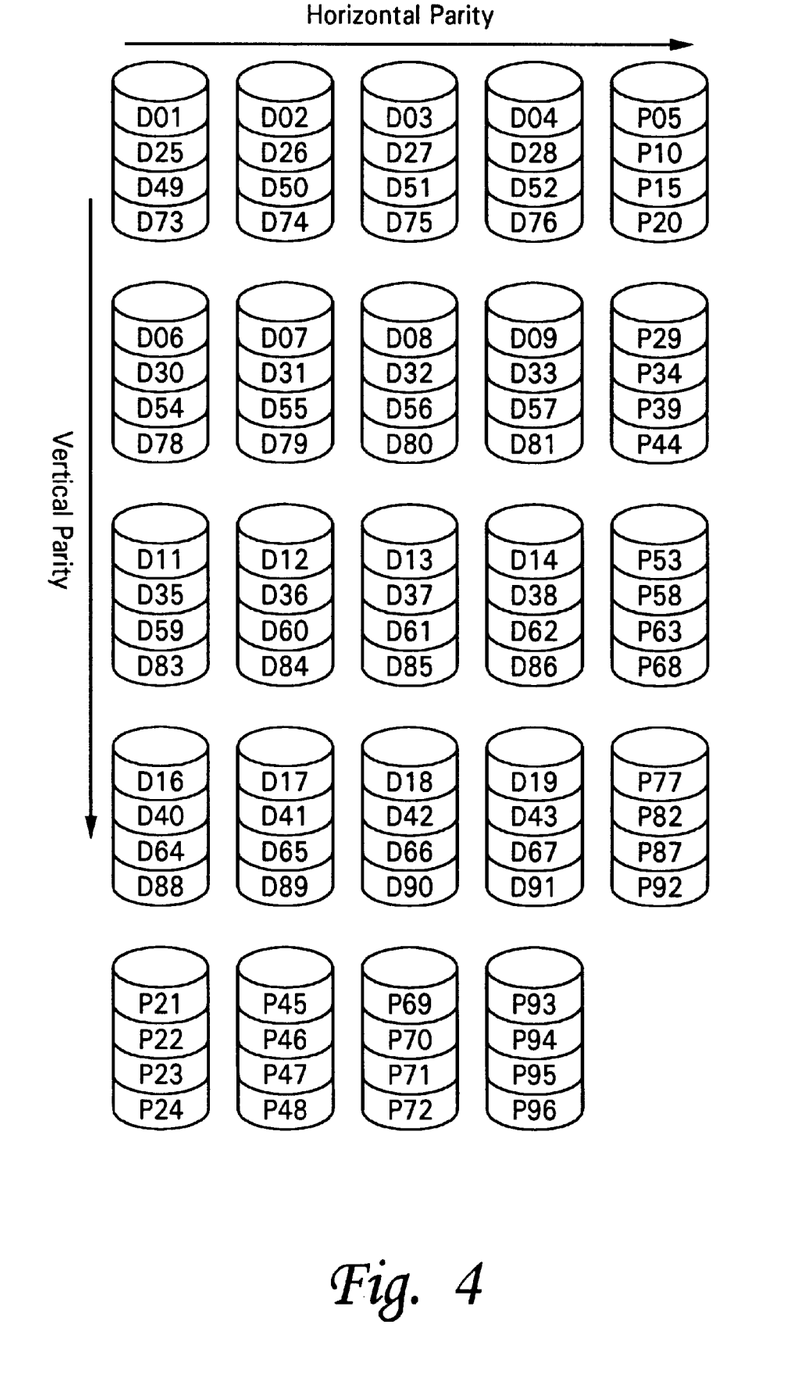
FIG. 4 is an illustration of parity distribution on a RAID 6 device in accordance with a preferred embodiment of the present invention.

Referring to FIG. 4, parity distribution on a RAID-6 device in accordance with a preferred embodiment of the present invention, is illustrated. A RAID-6 four by four disk array is shown with parity drives for the horizontal ranks and the vertical ranks. Drives D01–D24 represent a single level of segmentation, or stripe, in a RAID-6 configuration. D25 represents the beginning of the second level of segmentation (second stripe).

As discussed above, parity information in the vertical ranks is moved to the parity drive in the same rank as the subject data drive. Therefore, parity for the second stripe level, horizontal rank, is located on parity drive P29. The vertical parity for D01, is located on parity drive P21. Continuing in the same stripe, data drive stripe segment D07 parity is located in horizontal parity drive P10 and vertical parity drive P22. As a further example, data drive stripe segment D37, which is in the second stripe, has its horizontal parity stored on parity drive P39 and its vertical parity on parity drive P47. As discussed before, the parity information for multiple blocks can now be read in a single operation. The horizontal or vertical parity for a particular drive does not have to be read because the information is also contained in the alternate parity drive. Only if a parity drive fails will the need for the alternate parity drive become necessary.

The method of the present invention is an improvement over current RAID-6 parity operations. Storing the parity information for multiple drive stripes on a single parity drive reduces the number of parity reads and writes. By reducing the number of read and write operations performed by the RAID-6 controller, extra drives may be added to a RAID-6 device and still maintain the same number of controller transactions. At the very least, as demonstrated by Table 1, an improvement in the number of transactions (physical operations) of at least 20 percent is attainable. This reduction can be used to reduce the transactions load on the controller. If the object was to increase the memory storage capacity, the number of drives in the RAID-6 device may be increased and the transactions load could stay the same. With a 20 percent reduction in transactions available, an increase in 20 percent in drive capacity is possible. In a ten by ten array, the increase is substantial.

Thus, the present invention provides a method for reducing the number of parity writes for RAID-6 devices. Also, the method of the present invention enables the RAID-6 device to reduce the Input/Output load on the controller which allows more drives to be added in the drive group within a RAID 6 device.

While the invention has been particularly shown and described with reference to a preferred embodiment, it will be understood by those skilled in the art that various changes in form and detail may be made therein without departing from the spirit and scope of the invention.

What is claimed is:

1. A method for reducing the number of transactions for multi-segmented host system write operations in a RAID-6 device, comprising the steps of:

writing multiple new data segments to at least one data stripe on said RAID-6 device;

writing a first new parity, corresponding to a single said data stripe, to a single vertical parity drive and a single horizontal parity drive; and     writing a second new parity, corresponding to a second single said data stripe, beginning after the end of said first new parity.

2. The method of claim 1, wherein writing said multiple new data segments to said RAID-6 device, further comprises:

writing said data segments to stripes on multiple data drives within said RAID-6 device; and writing said new parity in a continuous fashion to a predetermined vertical and horizontal parity drive within said RAID-6 device.

3. The method of claim 2, wherein writing said new parity to a predetermined vertical and horizontal parity drive within said RAID-6 device, further comprises:

writing said new horizontal parity of a single data drive stripe to a predetermined location on said horizontal parity drive; and writing said new vertical parity of said single data drive stripe to a predetermined location on said single vertical parity drive.

4. The method of claim 1, wherein said step of writing said second new parity, corresponding to a second single said data stripe, beginning said write after the end of said first new parity further comprises:

continuing to write new parity of subsequent data stripes, in order, to a location following the preceding new parity write.

5. The method of claim 1, further comprises:

regenerating data segments by reading said new parity of said data segments from a single horizontal or vertical parity drive if two drives of said plurality of data drives fails.

6. The method of claim 1, further comprises:

regenerating data segments by reading said new parity of said data segments from a single horizontal or vertical parity drive if one drive of said plurality of data drives fails.

7. The method of claim 1, further comprises:

regenerating data segments by reading said new parity of said data segments from a single horizontal or vertical parity drive if one data drive of said plurality of data drives fails and one parity drive fails.

8. The method of claim 1, further comprising:

instructions within said computer readable medium for regenerating data segments by reading said new parity of said data segments from a single horizontal or vertical parity drive if one data drive of said plurality of data drives fails and one parity drive fails.

9. An apparatus for reducing the number of transactions for multi-segmented write operations in a RAID-6 device, comprising:

a host system;

a controller connected to said host system, for reading and writing multiple new data segments to at least one data stripe on said RAID-6 device;

means for writing a first new parity, corresponding to a single said data stripe, to a single vertical parity drive and a single horizontal parity drive;

means for writing a second new parity, corresponding to a second single said data stripe, beginning after the end of said first new parity.

10. The controller of claim 9, wherein means for writing said multiple data segments to said RAID-6 device, further comprises:

means for writing said data segments to stripes on multiple data drives within said RAID-6 device; and means for writing said new parity in a continuous fashion to a predetermined vertical and horizontal parity drive within said RAID-6 device.

11. The controller of claim 10, wherein said means for writing said second new parity, corresponding to a second single said data stripe, beginning said write after the end of said first new parity further comprises:

means for writing new parity of subsequent data stripes, in order, to a location following the preceding new parity write.

12. The controller of claim 9, wherein means for writing said new parity to a predetermined vertical and horizontal parity drive within said RAID-6 device, further comprises:

means for writing said new horizontal parity of a single data stripe to a predetermined location on said horizontal parity drive; and means for writing said new vertical parity of said single data stripe to a predetermined location on said single vertical parity drive.

13. The controller of claim 9, further comprising:

means for regenerating said data segments by reading said new parity of said data segments from a single horizontal or vertical parity drive if two drives of said plurality of data drives fails.

14. The controller of claim 13, further comprising:

means for regenerating said data segments by reading said new parity of said data segments from a single horizontal or vertical parity drive if one data drive fails.

15. The controller of claim 14, wherein said controller further comprising, means for regenerating data segments if one data drive of said multiple data drives and one parity drive of said at least two parity drives fails by reading said new parity of said data segments from a single horizontal or vertical parity drive.

16. A computer program product within a computer readable medium having instructions for reducing the number of transactions for multi-segmented host system write operations in a RAID-6 device, comprising:

instructions within said computer readable medium for writing multiple new data segments to at least one data stripe on said RAID-6 device;

instructions within said computer readable medium for writing a first new parity, corresponding to a single said data stripe, to a single vertical parity drive and a single horizontal parity drive; and instructions within said computer readable medium for writing a second new parity, corresponding to a second single said data stripe, beginning after the end of said first new parity.

17. The computer program product of claim 16, wherein instructions for writing said multiple data segments to at least one data stripe on said RAID-6 device, further comprises:

instructions within said computer readable medium for writing said data segments to stripes on multiple data drives within said RAID-6 device; and instructions within said computer readable medium for writing said new parity in a continuous fashion to a predetermined vertical and horizontal parity drive within said RAID-6 device.

18. The computer program product of claim 17, wherein instructions for writing said new parity to a predetermined vertical and horizontal parity drive within said RAID-6 device, further comprises:

instructions within said computer readable medium for writing said new horizontal parity of a single data drive stripe to a predetermined location on said horizontal parity drive; and instructions within said computer readable medium for writing said new vertical parity of said single data stripe to a predetermined location on said single vertical parity drive.

19. The computer program product of claim 16, wherein writing said second new parity, corresponding to a second single said data stripe, beginning said write after the end of said first new parity, further comprises:

instructions within said computer readable medium for continuing to write new parity of subsequent data stripes, in order, to a location following the preceding said new parity write.

20. The computer program product of claim 16, further comprising:

instructions within said computer readable medium for regenerating data segments by reading said new parity of said data segments from a single horizontal or vertical parity drive.

21. The computer program product of claim 16, further comprising instructions within said computer readable medium for regenerating data segments by reading said new rarity of said data segments from a single horizontal or vertical parity drive if one drive of said plurality of data drives fails.

* * * * *

UNITED STATES PATENT AND TRADEMARK OFFICE
CERTIFICATE OF CORRECTION

PATENT NO. : 6,101,615
DATED : Aug. 8, 2000
INVENTOR(S) : Lyons

It is certified that error appears in the above-identified patent and that said Letters Patent are hereby corrected as shown below:

In Col. 3, line 1, please delete "DO" and insert --D01--.

In Col. 10, line 6, please delete "rarity" and insert --parity--.

Signed and Sealed this

Eighth Day of May, 2001

*Attest:*

NICHOLAS P. GODICI

*Attesting Officer*  *Acting Director of the United States Patent and Trademark Office*